April 21, 1953     D. G. MUCKLE     2,635,918
RAIN SHIELD AND DRAIN DEVICE
Filed Aug. 11, 1951
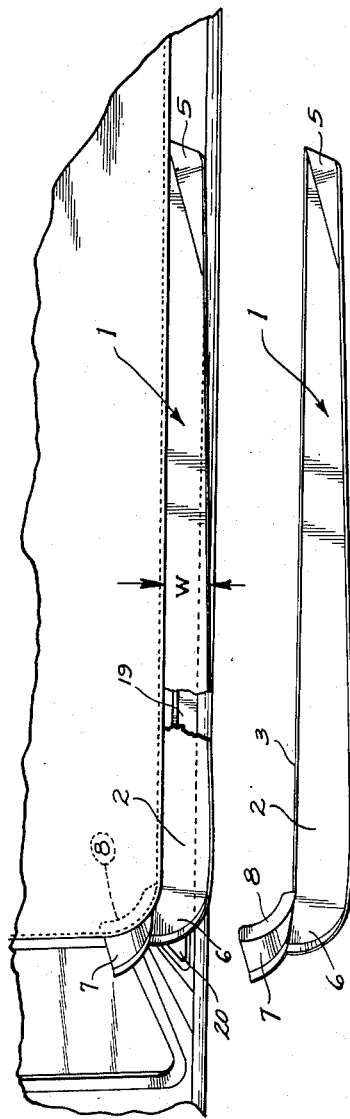
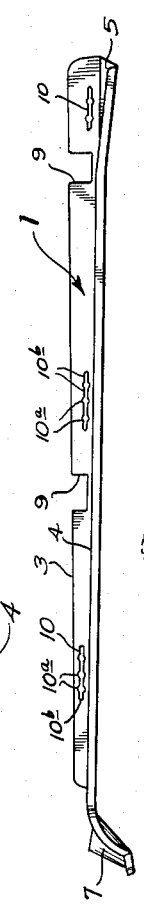
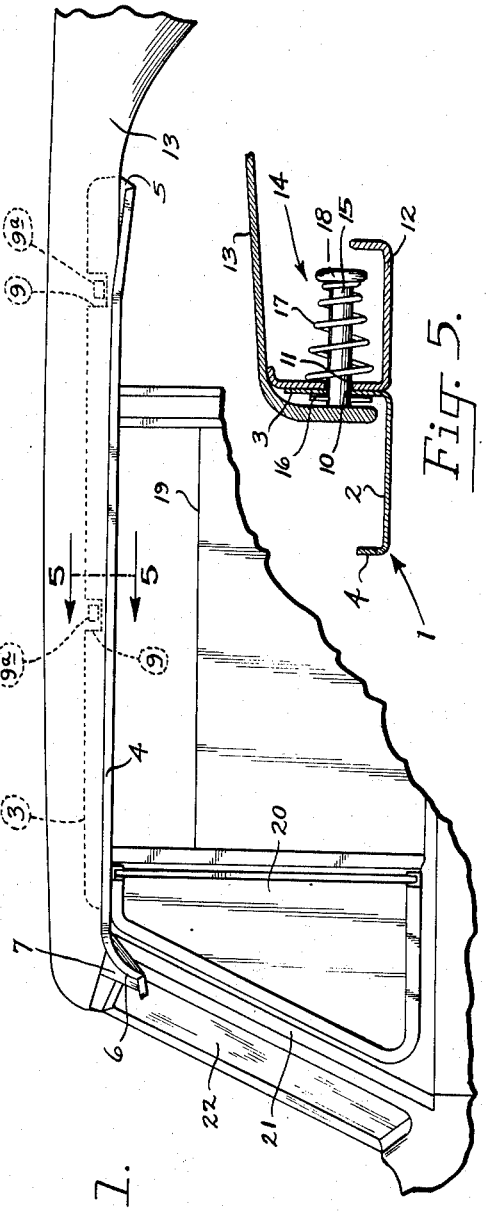
Fig. 4.   Fig. 3.   Fig. 2.   Fig. 1.   Fig. 5.
INVENTOR.
Dean G. Muckle
BY
Atty.

Patented Apr. 21, 1953

2,635,918

UNITED STATES PATENT OFFICE 2,635,918

RAIN SHIELD AND DRAIN DEVICE

Dean G. Muckle, Portland, Oreg.

Application August 11, 1951, Serial No. 241,459

7 Claims. (Cl. 296—137)

This invention relates to a combination rain shield and drain device of particular utility in protecting a modern, convertible type automobile against damage by rain or moisture which otherwise might enter the automobile side windows when these windows are open. More specifically stated, this device is adapted for quick attachment to and detachment from the collapsible top of a convertible type vehicle whereby the side windows and doors of the vehicle may be shielded and protected from rain and from moisture which drains off the top and whereby moisture which does so drain off will be collected and drained off at a point removed from the windows and doors.

Historically, the design of the automobile window has undergone a slow evolutionary process as the design of the automobile body has progressed from the box-like wood and metal structure of former years to the low slung, streamline structure of today. For example, improvements in the side windows of an automobile, with which this invention most particularly is concerned, have advanced the window design from a small, limited view square of plate glass or isinglass to a large, clear view rectangle of safety glass. Side by side with this improvement in glass area and material, other improvements have taken place. Thus, a generally triangular ventilation window has been added in front of the side window and the entire window frame has been arranged at an incline or outward slope to the vertical rather than in a straight vertical plane to decrease wind resistance and lend a streamline appearance to the body. These improvements, however, also have created new problems in connection with the drainage of water from the top or roof of the automobile and in the shielding or protection of the automobile interior against the entrance of rain and moisture while traveling with the windows open. For example, in the days of the small area, vertical side window, little if any, rain would fall through an open window in a parked automobile. Today, however, the side window slope allows and even accommodates the entrance of rain under such circumstances. It is toward an improved solution to the new problems thus presented by the streamline design of modern automobiles, and particularly as such problems are evidenced in the need for protection of a convertible type vehicle, that the instant invention is directed.

As presently assembled, convertible vehicles have collapsible fabric tops which are devoid of rain shields and drains. Accordingly, a passenger alighting from or entering such a vehicle during a rain is showered with drippings which roll off of or are shaken from the roof. Further, when the side or ventilating window are open in a modern convertible, as they should be to signal while driving, rain is driven into and drippings fall into the automobile interior because the bottoms of these windows are spaced laterally out from the top in accord with the streamline design now in vogue. Further, none of the prior art structures with which I am familiar has provided an adequate protection for the sloping or inclined side windows of today. Accordingly, one object of my invention is to provide a combination rain shield and drain device for the top of a modern, sloping side window convertible, which device will extend laterally out and over and will curve forwardly down and over the side window and side ventilation window, respectively, a sufficient distance to span the slope of these windows and shield the same, when open, against the entrance of rain and moisture.

Referring now to other disadvantages which are inherent in the prior art structures, I classify these disadvantages in accord with the type of drain or "drip channel" device which is provided. Thus, the first classification may be said to include those jointed structures and devices which are made integral with and which fold up with the support members of the convertible top when the latter is collapsed. One obvious disadvantage of this type of device is the expense which the provision and maintenance of an intricate folding, and accompanying sealing joint structure, requires. Further, because these devices are welded or otherwise permanently fastened to the support members of the top, they require the services of a mechanic, welder, or the like during installation or replacement. In view of these disadvantages, another object of my invention is to provide a simple, unitary or single piece drain and rain shield device which easily may be attached or detached by the average motorist without employing special tools, welding and the like.

The second prior art classification includes those drain devices which are, in effect, attachments meant to be put in place when the top is up, and to be removed when the top is collapsed. Those drains of this type with which I am familiar either are attached to the top of the automobile door or to the beading which bounds the fabric top of a convertible. The first of these, the door attachment device, is unsatisfactory because of the obvious loose fit which is effected when a thin, sheet metal tab is bent frictionally to engage the top of a door. Thus, these devices often fall off or become loose and rattle after the door has been opened a few times. The second device, on the other hand, employs sharply pointed hooks which penetrate the fabric bead and, after repeated attachment and removal, tend to tear and destroy the bead and fabric top. Furthermore, both of these second classificatory drain devices rattle against and mar the finish of the door and body when the automobile is driven over a rough road. Accordingly, a further object of the instant invention is to provide a novel, quick detachable means, in combination with and for securing a rain shield and drain device to the top of a convertible, such a means to prevent rattling under even the most adverse conditions, to protect the automobile body against marring, and not to pierce or otherwise harm or destroy the fabric top in spite of repeated use over a long period of time.

These and other desirable objects, capabilities and advantages inherent in and encompassed by the invention will become apparent from the ensuing description, taken in conjunction with the accompanying drawing, wherein;

Fig. 1 is a partial side view of a convertible type automobile showing the rain shield and drain device of this invention as it appears when attached and in place over the side and side ventilation windows of a typical, convertible type automobile;

Figs. 2 and 3 are related side and top views, respectively, of the drip pan member per se, these views more particularly revealing the structure of the upstanding inner flange by means of which the pan is attached to the top and the structure of the runoff extension piece or shield which overlies the windshield of the automobile;

Fig. 4 is a partial top view of the convertible automobile with the invention in place and with a portion of the drip pan member broken away better to illustrate the manner in which the lateral width of the device is made greater than the horizontal component of the slope of the side window so the pan will overlie and shield the entire side window; and Fig. 5 is a section view, taken substantially on the line 5—5 of Fig. 1 and enlarged over the previous views, showing one of the quick detachable latching pin means which serve as the sole means for securing the drip pan member to the support members in such manner as best will prevent rattling.

In Figs. 2 and 3 of the drawings, I have shown the rain shield and drain device per se. The structure thereof includes an elongated drip pan member 1 having a flat bottom section 2 which is bounded at the sides by an upstanding inner flange 3 and a shorter but similar upstanding outer rim 4. Thus, in cross section (see Fig. 5), the drip pan member 1 is channel shaped with one long leg and one short leg. As shown to the right of Figs. 1 to 4, the rear portion of the drip pan member is open to allow water to run off. To this end, the rear portion defines a first downturned drain portion 5 which slopes laterally out from the flange 3 to the rim 4. When in use, this first drain portion 5 directs the runoff of rain or other moisture laterally out and away from the inner flange 3.

At the front of the drip pan member, a second downturned drain portion 6 is provided with a rounded, shield-like extension piece 7 which protrudes laterally in at an oblique angle to the main body of the drip pan. Further, the top of the extension piece 7 terminates in a flat rib 8 which, together with the flange 3 is arranged to underlie the peripheral margin of the fabric top 13 of a convertible vehicle better to seal the joint between the fabric and metal against the entrance of moisture.

Referring now to Figs. 1 and 2, the inner flange 3, which is higher than the outer rim 4, will be seen to carry a plurality of slots 9. Each of these slots 9 is adapted to straddle a snap or a corresponding one of the lateral support ribs 9a which are conventional in a convertible type automobile. Further, the flange 3 is pierced by a plurality of bayonet type apertures 10, each of which includes an enlarged central section 10a opening laterally to two more narrow neck or end sections 10b. Each of these apertures 10 is adapted to overlie a corresponding attachment hole 11 formed in one of the longitudinal support members 12 of the collapsible top for the automobile (see Fig. 5).

In cooperation with the aforementioned bayonet type apertures 10 and the attachment holes 11, I have provided a novel quick detachable means for securing the drip pan member 1 to the longitudinal support member 12 without requiring the use of special tools and without marring or otherwise harming the fabric top shown at 13. This quick detachable means includes a latching pin 14 having an elongated shank 15 which terminates in a laterally protruding cross bar 16. The shank 15 is contoured to fit slideably within the central round portion 10a of the aperture 10 and the cross bar 16, likewise, is adapted to fit through the narrow end sections 10b of the apertures. Further, a spiral compression spring 17 is carried between an enlarged head 18 and the inner surface of the longitudinal support member 12. Thus, a plurality of the latching pins 14 normally will be provided in place within the attachment holes 11 of the longitudinal support member of a convertible top either when the vehicle first is manufactured or thereafter. When the drip pan member 1 is to be secured in place, the apertures 10 are positioned over the attachment holes 11 and the cross bars 16 are fitted through the narrow portions 10b of the apertures by pushing on the head 18 and compressing the spring 17. Thereafter, the latching pin 14 is rotated approximately 90° and the ends of the cross bar 16 catch upon and engage the flange 3 securely to lock the drip pan member in place. Such an attachment means, in contrast to those heretofore employed, does not mar either the fabric top 13 or the painted portions of the vehicle and the drip pan member is held securely, by the force of the spring 17, so as to prevent rattling when the automobile traverses a rough road.

Turning now to Figs. 1 and 4, I have shown the drip pan member 1 as it appears when attached to a typical convertible type vehicle. As explained previously, modern convertible automobiles, of the type shown, are provided with a side window 19 and a side ventilation window 20 which slope laterally out from top to bottom (note the slope in Fig. 4). This outward slope, together with the slope of the rounded corner post 21 and the windshield 22, lends a modern, streamline appearance to the automobile. However, as an inspection of Fig. 4 will make apparent, this slope also presents a problem since vertically falling rain and runoff water from the top of the vehicle easily are admitted to the automobile interior when the windows are open. This is so since the bottom of these windows are spaced laterally out further than the top thereof. It is for these reasons, that I have provided the flat bottom 2 of the drip pan member 1 with an average lateral width W (see Fig. 4) which is at least as great as and at best is made to exceed the horizontal component of the side window slope. Thus, a portion of the rain shield and drain device vertically overlies the bottom both of the side window 19 and the side ventilation window 20 so that these windows may be left open in the rain with less chance of moisture being driven into or falling into the interior of the automobile. Further, as best shown in Fig. 1, the front downturned drain portion 6 overlies and spans a substantial portion of the top of the pivotal ventilation window 20 further to protect this window from the entrance of moisture. In cumulative utility with this extension piece, the outer rim 4 extends completely along the outer margin both of the front drain portion 6 and the shield-like extension piece 7 so that drainage from the drip pan member will be discharged obliquely in, over and down the windshield 22. Thus, whether moisture and rain drips off the sides or the front corners of the fabric top 13, it will be collected by the drip pan member 1 and discharged either over the windshield 22 or laterally out and away from the body of the car by the rear downturned drain portion 5.

In conclusion, it will be seen that I have provided a combination rain shield and drain device which is adapted for quick attachment to and detachment from the collapsible top of a convertible type vehicle. To effect such attachment or detachment, it is not necessary to employ special tools, welding, or the like and the average motorist can effect this operation with a minimum of effort. Further, I have provided a rain shield which extends laterally out and over and curves forwardly down and over the side window and side ventilation window, respectively, a sufficient distance to span the slope of these windows and to shield the same, when open, against the entrance of rain and moisture. Still further, I have provided a novel quick detachable means which is the sole means for attaching the device to the automobile and which serves to hold the device against rattling. Thus, the device cannot and will not mar the highly polished finish of the automobile or otherwise destroy or harm any portion of the fabric top or doors.

I claim:

1. In combination with the collapsible top of a convertible vehicle of the type having a windshield and having side windows which slope laterally out from top to bottom, a pair of elongated rain shield and drain means for detachable engagement with the respective sides of said vehicle above said side windows to shield the windows from rain and from moisture draining off the top of the vehicle, each said means comprising; an elongated drip pan of channel shaped cross section having a flat bottom terminating in an upstanding inner flange, said flat bottom extending laterally out a sufficient distance to overlie and to span the slope of one of said side windows and to shield the window against the entrance of moisture falling in a vertical plane, and quick detachable means for securing said inner flange to the side of the vehicle collapsible top, the front portion of said drip pan extending laterally in and over the windshield of said vehicle.

2. In combination with the collapsible top of a convertible vehicle of the type having side windows which slope laterally out from top to bottom, a pair of elongated drain means for detachable engagement with the respective sides of said vehicle above said side windows to shield said windows from rain and from moisture draining off the top of the vehicle, each said drain means comprising; an elongated, channel shaped drip pan having a flat bottom interconnecting an upstanding inner flange and an upstanding outer rim, said flat bottom having a lateral width at least as great as the horizontal component of the side window slope whereby a portion of the drain means vertically overlies the bottom of said side window, and quick detachable means for securing said inner flange to the side of the vehicle collapsible top, the rear portion of said drip pan having a lateral slope down and away from said inner flange toward said outer rim to conduct the drainage from said rear portion to a point spaced laterally out from said side window.

3. A detachable rain shield and drain device, comprising an elongated drip pan having a wide flat bottom, a flat flange member upstanding from the inner margin of said flat bottom and carrying a spaced plurality of elongated, bayonet type apertures adapted to receive a like plurality of quick detachable means for securing said drip pan in place, the front of said drip pan having a downturned drain portion with a rounded, shield-like extension piece protruding laterally at an oblique angle to the inner margin thereof.

4. A detachable drain device for use with the fabric top of a convertible vehicle having side windows and a windshield, comprising an elongated drip pan member adapted to extend longitudinally along and laterally out from one side of said top to overlie and shield the window on that side of the vehicle, an elongated slotted flange upstanding from the inner margin of said drip pan, an upstanding rim extending longitudinally along the outer margin of said drip pan, said flange being higher than said rim, said drip pan having an open rear end with a first downturned drain portion sloping laterally out from said flange to said rim, the front of said drip pan having a second downturned drain portion with a rounded, shield-like extension piece protruding laterally in at an oblique angle to the inner margin thereof and carrying a flat rib positioned to overlie the windshield of said vehicle, said flat rib and said slotted flange being arranged to underlie the margins of said fabric top, said upstanding rim extending along the outer margin of both said second drain portion and said shield-like extension piece to control and direct the drainage therefrom over said windshield.

5. A detachable drain device for the collapsible top of a convertible vehicle, said top having lateral support ribs interconnected with longitudinal support means at each side thereof, a fabric top covering said support ribs and connected to said support means with snap fasteners, a plurality of longitudinally spaced attachment holes opening laterally through and bounded by each of said longitudinal support means, each said detachable drain device comprising; an elongated, channel shaped drip pan having an upstanding inner flange and an upstanding outer rim joined by a flat bottom section, a plurality of slots piercing said inner flange and adapted to straddle said snap fasteners, said drip pan being of tapered, narrowing outline intermediate open front and rear runoff portions, a plurality of bayonet type apertures piercing said inner flange at spaced points adapted to overlie the attachment holes in said longitudinal support means, each said aperture having an enlarged central section open to more narrow, elongated end sections on both sides thereof, and a plurality of rotatable latching pin means each of which is contoured slideably to enter one of said apertures and one of said attachment holes for securing said drip pan detachably to a companion one of said longitudinal support means, each such latching pin means including an elongated shank carrying a laterally protruding cross bar arranged, respectively, to mate with and freely to enter said enlarged central section and said narrow end sections, but to engage the corresponding aperture when rotated 90°.

6. A detachable drain device for the top of a convertible vehicle, said top having longitudinal support means at each side thereof, said vehicle having outwardly sloping side and side ventilation windows terminating forwardly adjacent rounded and forwardly sloping corner posts, each said detachable drain device comprising; an elongated drip pan having an upstanding inner flange and an upstanding outer rim joined by a flat bottom section, said drip pan being a single integral piece adapted longitudinally to span one of said side and ventilation windows and laterally to overlie and fully to span the horizontal component of the outward slope thereof, a plurality of spring biased, rotatable latching pin means for securing said drip pan detachably to a companion one of said longitudinal support means, said latching pin means serving as the sole means for securing said drip pan to said longitudinal support means, and a runoff extension piece pendent from the front portion of said drip pan and extending laterally in therefrom.

7. In combination with the collapsible top of a convertible vehicle having combined side and side ventilation windows which slope laterally out from top to bottom, a pair of elongated rain shield and drain means for detachable engagement with the respective sides of said vehicle above said side windows to shield said windows from rain and from moisture draining off the top of the vehicle, each said means comprising; an elongated, channel shaped drip pan having a flat bottom interconnecting an upstanding inner flange and an upstanding outer rim, said flat bottom having a lateral width at least as great as the horizontal component of the side window slope whereby a portion of the rain shield and drain means vertically overlies the bottom of said side window, quick detachable means for securing said inner flange to the side of the vehicle collapsible top, said quick detachable means serving as the sole means for securing said drip pan to said longitudinal support means, and an extension piece pendent from the front portion of said drip pan and extending laterally in therefrom, said extension piece being rounded and sloping downwardly and around a companion one of said corner posts a sufficient distance to overlie and to shield a major portion of the ventilation window associated therewith.

DEAN G. MUCKLE.

References Cited in the file of this patent

UNITED STATES PATENTS

| Number | Name | Date |
|---|---|---|
| D. 148,831 | Wagner | Feb. 24, 1948 |
| 2,039,212 | Callahan | Apr. 28, 1936 |
| 2,108,322 | Thorp | Feb. 15, 1938 |
| 2,177,215 | Hodgkinson | Oct. 24, 1939 |
| 2,260,048 | Newell | Oct. 21, 1941 |
| 2,482,982 | Keier | Sept. 27, 1949 |
| 2,524,171 | Karsted | Oct. 3, 1950 |
| 2,544,580 | Blanchet | Mar. 6, 1951 |